United States Patent

Shimokawato et al.

[11] Patent Number: 5,815,469
[45] Date of Patent: Sep. 29, 1998

[54] MAGNETO-OPTICAL RECORDING DEVICE HAVING RECORDING MAGNETIC FIELD IN THE SAME DIRECTION AS REPRODUCING MAGNETIC FIELD

[75] Inventors: Satoshi Shimokawato; Hiromu Miyazawa; Toshiaki Mikoshiba, all of Suwa, Japan

[73] Assignee: Seiko Epson Corporation, Tokyo-To, Japan

[21] Appl. No.: 705,284

[22] Filed: Aug. 29, 1996

Related U.S. Application Data

[60] Division of Ser. No. 339,510, Nov. 14, 1994, Pat. No. 5,574,703, which is a continuation-in-part of Ser. No. 717,672, Jun. 19, 1991, abandoned.

[30] Foreign Application Priority Data

Jun. 21, 1990 [JP] Japan ................................ 2-163510
May 20, 1991 [JP] Japan ................................ 3-114919

[51] Int. Cl.$^6$ ........................................ G11B 11/00
[52] U.S. Cl. .............................. 369/13; 369/110
[58] Field of Search ................. 369/13, 14, 110; 360/59, 114; 365/122; 428/694 MM

[56] References Cited

U.S. PATENT DOCUMENTS 4,932,012 6/1990 Kobayashi ........................ 369/13
5,018,119 5/1991 Aratani et al. .................... 369/13
5,126,986 6/1992 Saito et al. ....................... 369/13

FOREIGN PATENT DOCUMENTS 0257530 2/1988 European Pat. Off. .
0318925 7/1989 European Pat. Off. .

*Primary Examiner*—Tan Dinh
*Attorney, Agent, or Firm*—Ladas & Parry

[57] ABSTRACT

To directly overwrite data on a magnito-optical recording medium formed of two exchange-coupled magnetic layers of a memory layer with a high coercive force and a low Curie point and a reference layer with a low coercive force and a high Curie point, an initializing magnetic field (e.g. 1000 to 5000 Oe) is applied to the medium to arrange the magnetization direction of only the reference layer; a recording magnetic field (e.g. 100 to 400 Oe) is applied and simultaneously a recording laser beam modulated according to data is irradiated upon the medium to record the data as magnetization directions of the memory layer; the initializing magnetic field is applied again to the medium to arrange the magnetization direction of only the reference layer; and a reproducing magnetic field (e.g. 1000 Oe or less) is applied and simultaneously a reproducing laser beam is irradiated upon the medium to reproduce the data. Since the reproducing magnetic field the same in direction as the recording magnetic field is applied to the medium in reproducing operation, recorded data can be stably reproduced without destruction by use of a high sensitive recording medium, in particular.

2 Claims, 4 Drawing Sheets

MAGNETO-OPTICAL RECORDING DEVICE HAVING RECORDING MAGNETIC FIELD IN THE SAME DIRECTION AS REPRODUCING MAGNETIC FIELD

This is a divisional application of prior application Ser. No. 08/339,510 filed Nov. 14, 1994 and now U.S. Pat. No. 5,574,703, which is a continuation-in-part of application Ser. No. 07/717,672 filed Jun. 19, 1991 and now abandoned.

BACKGROUND OF THE INVENTION

The present invention relates to a magneto-optical method and apparatus for recording/reproducing data and, more specifically, to such a method and apparatus also enabling data to be directly overwritten.

Recently, a magneto-optical recording/reproducing technique adopting a perpendicularly magnetized film for a recording medium has been widely researched for optically rewritable recording, and a first generation of recording/reproducing apparatus using such a recording medium has already been put into practical use. When data are rewritten in the first generation recording/reproducing apparatus, however, two operations of first erasing already written data and then writing new data are required. It is impossible to realize a so-called direct overwrite, which requires no erasing operation. As a result, the data transfer speed is considerably lower than that of a rigid disk device.

To overcome the above problem, various techniques are now being developed to realize direct overwrite. For example, a technique adopting an exchange coupled magnetic multilayer film as the recording medium is disclosed in Japanese Published Unexamined (Kokai) Patent Appln. No. 62-175948. In this direct overwrite technique, the multilayer film is formed by laminating a first magnetic layer (referred to as a memory layer) and a second magnetic layer (referred to as a reference layer) on a substrate in sequence. The data are recorded by modulating the intensity of a recording laser beam into binary according to recorded data and irradiating the intensity-modulated recording laser beam upon the recording medium. In this recording operation, when the recording laser beam heats the recording medium to a relatively low temperature, magnetic domains of the reference layer that were already initialized prior to this recording operation are transcribed into the memory layer by an exchange coupling force between the two magnetic layers (referred to as L recording). On the other hand, when the recording laser beam heats the recording medium to a relatively high temperature, the magnetic domains of the reference layer are reversed by a recording magnetic field, and then the reversed magnetic domains are transcribed into the memory layer by the exchange coupling force between the two magnetic layers (referred to as H recording). In the reproduction operation, after the reference layer has been initialized, a reproducing laser beam is irradiated upon the recording medium to reproduce so recorded data.

In this technique, therefore, a direct overwrite data recording/reproducing apparatus can be realized for the exchange coupled magnetic multilayer film recording medium by simply attaching a fixed magnetic field generating mechanism for initializing the magnetization direction of the reference layer to a first generation recording/reproducing apparatus having a recording magnetic field and an intensity-modulated laser beam.

In this technique, however, there exists a problem in that already recorded data are destroyed when the intensity of the reproducing laser beam erroneously increases in a reproducing operation or when the ambient temperature or the apparatus temperature rises during the reproducing operation (even at the normal reproducing laser beam intensity). Moreover, this problem increases with increasing sensitivity of the recording medium.

SUMMARY OF THE INVENTION

With these problems in mind, therefore, the object of the resent invention is to provide a magneto-optical method and apparatus for recording/reproducing data having a wide allowable range to the ambient and apparatus temperatures and the reproducing laser beam intensity in reproducing operation and, therefore, suitable for use with a high-sensitivity recording medium, in particular.

To achieve the above-mentioned object, the present invention provides a magneto-optical method of recording/reproducing data that uses a magnito-optical recording medium formed by laminating a first magnetic layer having a relatively high coercive force at room temperature and a relatively low Curie point and a second magnetic layer having a relatively low coercive force at room temperature and a relatively high Curie point so that these magnetic layers are exchange coupled to each other. The method comprises the steps of: (a) arranging the magnetization direction of only the second magnetic layer in a direction by applying an initializing magnetic field to the recording medium; (b) selecting either one of a first record or a second record according to data: to be recorded, the first record being to magnetize only a heated area on the first magnetic layer in a direction stable with respect to the second magnetic layer by applying a recording magnetic field and simultaneously irradiating a laser beam for realizing a first heated condition to the recording medium, and the second record being to first reverse the magnetization direction on the heated area of the second magnetic layer and then to magnetize the first magnetic layer in the direction stable with respect to the second magnetic layer by applying a recording magnetic field and simultaneously irradiating a laser beam for realizing a second heated condition upon the recording medium; (c) arranging the magnetization direction of only the second magnetic layer in a direction by applying the initializing magnetic field to the area at which the first and second records have been performed; and (d) reproducing data recorded as magnetization direction of the first magnetic layer by irradiating a reproducing magnetic field the same in direction as the recording magnetic field and simultaneously a laser beam to the area at which the first and second records are performed after the initializing magnetic field has been applied.

Further, the present invention provides a magneto-optical apparatus for recording/reproducing data, comprising means for generating an initializing magnetic field; means for irradiating a laser beam to the recording medium at data recording and reproducing operation, respectively; and means for applying a recording magnetic field and a reproducing magnetic field to an area irradiated with the laser beam on the recording medium at the data recording and reproducing operation, respectively.

In the magneto-optical method of recording/reproducing data according to the present invention, there is used a magneto-optical recording medium formed by laminating at least two mutually exchange-coupled magnetic layers on a substrate. The required relationship between the first magnetic layer (referred to as memory layer) and the second magnetic layer (referred to as reference layer) in coercive force H at room temperature and in Curie temperature T is as follows:

$H_1 > H_2$ $T_1 < T_2$ where

H$_1$ is coercive force at room temperature of the memory layer,

H$_2$ is coercive force at room temperature of the reference layer,

T$_1$ is Curie temperature of the memory layer, and

T$_2$ is Curie temperature of the reference layer.

Further, the magnetic characteristics of the magneto-optical recording medium of the present invention must satisfy the following relationship in the same way, as disclosed in Japanese Published Unexamined (Kokai) Patent Appl. Nos. 62-175948 and 63-153752:

$$H_1 > H_2 > \sigma/2M_s h$$

recording magnetic field is the same as that of the initializing magnetic field in the above description.

It would be necessary for the direction of the recording magnetic field to be opposite to that of the initializing magnetic field if other characteristics of the magneto-optical recording medium were used according to the following Table that shows three same-direction combinations of material characteristics of the memory and reference layers of the recording medium:

TABLE

|  | Memory layer | | |
| --- | --- | --- | --- |
|  | Tm-rich | RE-rich with T-comp | RE-rich without T-comp |
| Reference Layer | | | |
| TM-rich | Reverse direction | Reverse direction | Reverse direction |
| RE-rich with T-comp | *Same direction | Same direction | Same direction |
| RE-rich without T-comp | Reverse direction | Reverse direction | Reverse direction |

The mechanism of data destruction caused when reproduced by the prior-art recording/reproducing method has been studied in detail by the inventors and the following points have been clarified. In the case where data recorded in accordance with the above-mentioned method are reproduced in accordance with the prior-art method, a reproducing laser beam is usually irradiated upon the magnetic layer from the memory layer side without applying any magnetic field after the recording magnetic field has been removed. However, in case the intensity of the reproducing laser beam becomes high, the magnetization direction of the memory layer is reversed due to the same principle as in the L recording (first heating) of the above-mentioned recording process, so that the recording area as shown in the magnetization status changes to that as shown in the status, thus resulting in destruction of data recorded in the memory layer 11. In addition, this phenomenon can be recognized more clearly when the ambient temperature or the apparatus temperature rises.

The most important point of the present invention is to prevent recorded data from being destroyed in the reproducing operation, by applying a reproducing magnetic field to an area irradiated with the reproducing laser beam in the direction the same as the recording magnetic field. The intensity of she reproducing magnetic field is preferably equal to or higher than that of the recording magnetic field. However, the intensity of the reproducing magnetic field must be low to such an extent that no recording occurs, which is sufficiently lower than that of the initializing magnetic field. Here, it should be noted that in the data reproducing process according to the present invention, as far as a reproducing magnetic field with an appropriate intensity is applied, data will not be destructed even if a reproducing laser beam with an intensity higher than that of the laser beam for the L record process is irradiated upon the recording medium. This indicates that the present invention can realize a high data reading reliability even when a magneto-optical recording medium with higher recording sensitivity is used.

In the present invention, the initializing magnetic field and the recording magnetic field are determined preferably within a range 1000 to 5000 Oe and 100 to 400 Oe respectively, according to the used recording medium. Further, the intensity of the reproducing magnetic field is equal to or higher than that of the recording magnetic field to such an extent that the H recording will not occur. However, the intensity of the reproducing magnetic field is preferably 1000 Oe and, more preferably, 800 Oe or less from the practical standpoint.

In the practical magneto-optical recording/reproducing apparatus, it is preferable to generate the recording magnetic field by a permanent magnet from the power consumption standpoint. Therefore, the present invention can be embodied by using the recording magnetic field as the reproducing magnetic field as it is. In order to further improve the reproducing stability, however, it is preferable to provide a mechanism for generating a reproducing magnetic field higher in intensity than the recording magnetic field, for instance by applying a magnetic field obtained by superposing another magnetic field upon that generated by a permanent magnet, to the area irradiated with the reproducing laser beam, at only the reproducing process. Instead, it is also possible to use a reproducing magnetic field generated by a permanent magnet and a recording magnetic field obtained as a resultant magnetic field of the reproducing magnetic field and the permanent magnet magnetic field applied in the opposite direction or else to generate both the magnetic fields by electromagnets.

Further, in the above description, the magnito-optical recording medium is an exchange coupled film composed of two magnetic layers. Without being limited thereto, a magneto-optical recording medium provided with an intermediate layer effective to suppress the interface wall energy density between the two layers can be effectively applied to the present invention.

DETAILED DESCRIPTION OF THE PREFERRED EMBODIMENTS

Embodiments of the present invention will be described in detail hereinbelow.

Figure 1:
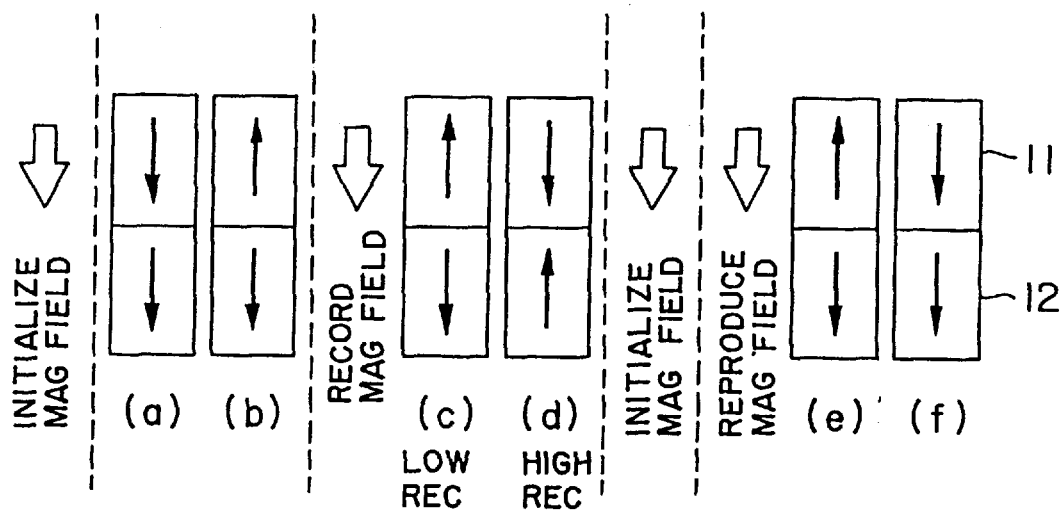
FIG. 1 is an illustration for assistance in explaining magnetization directions of the memory layer and the reference layer at the respective process of the magneto-optical recording/reproducing method according to the present invention.

FIG. 1 shows the apparent magnetized status of the memory layer and the reference layer by arrows at each process in the magneto-optical recording/reproducing method according to the present invention when rare earth-transition metal alloy films satisfying the above-mentioned "same direction" conditions of the Table are used as the memory layer and the reference layer.

At the first heating, the magnetization direction of the reference layer 12 will not change. However, the magnetization direction of the memory layer 11 is changed from either status (a) or (b) to the status (c) because the exchange energy with the magnetization of the reference layer 12 is low. On the other hand, at the second heating, the magnetization direction of the reference layer 12 is reversed, and that of the memory layer 11 is changed from either status (a) or (b) to the status (d) because the exchange energy with the magnetization of the reference layer 12 is low.

The status (c) or (d) can be changed to (e) or (f), respectively by applying an initializing magnetic field to the magnetic medium immediately before data are reproduced. The magnetization direction of the record layer 11 in status (e) or (f) corresponds to the first or second heated condition, respectively, so that data can be rewritten when a disk rotates once.

Figure 2:
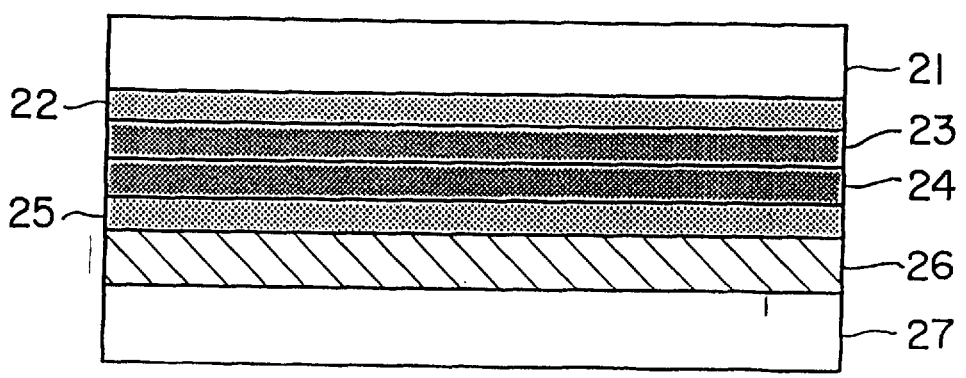
FIG. 2 is a cross-sectional illustration for assistance in explaining an exemplary construction of the magneto-optical recording medium to which the present invention can be applied.

FIG. 2 shows an exemplary cross-sectional illustration of the magneto-optical recording medium to which the method of the present invention is applied. The medium is comprised of a disk-shaped transparent substrate 21 formed with guide grooves (not shown) for a tracking servomechanism; a dielectric layer 22 formed of silicon nitride by sputtering; a memory layer 23 formed of NdDYFeCo; a reference layer 24 formed of DyFeCo; and a protective layer 25 formed of silicon nitride, which are all laminated in sequence. In addition, another substrate 27 is bonded onto the protective layer 25 by hot-melt resin 26. The thicknesses of the layers 22, 23, 24 and 25 are 80 nm, 100 nm, 100 nm, and 80 nm, respectively. The memory layer 23 is provided with magnetic characteristics dominant in transition metal magnetic moment at room temperature, and the reference layer 24 is provided with magnetic characteristics dominant in rare-earth magnetic moment and having a compensation point at a temperature higher than room temperature.

Figure 3:
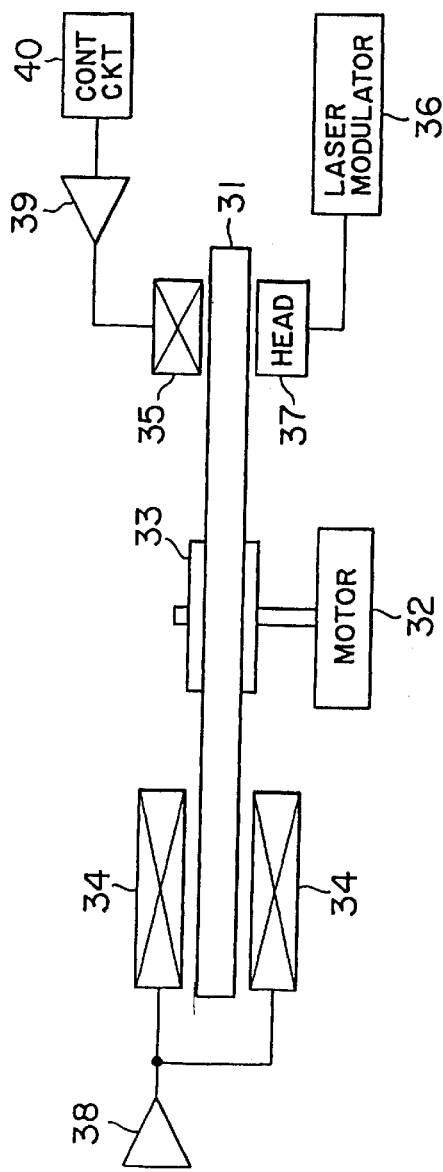
FIG. 3 is a diagrammatical view for assistance in explaining an embodiment of the magneto-optical recording/reproducing apparatus according to the present invention.

FIG. 3 shows an embodiment of the magneto-optical apparatus for recording/reproducing data according to the present invention. The afore-mentioned magneto-optical recording medium 31 is attached to a spindle motor 32 via a medium clamp mechanism 33. When the spindle motor 32 rotates, the recording medium 31 is first initialized being passed through an initializing magnetic field generated by an initializing electromagnet 34 driven by a driver 38, and then irradiated with a recording laser beam modulated by a laser modulator 36 and emitted from an optical head 37 within a recording magnetic field generated by a recording/reproducing electromagnet 35 driven by another driven 39. In reproducing operation, on the other hand, the recording medium 31 is initialized again by the initializing magnetic field and then irradiated with a reproducing laser beam emitted from the optical head 37 within a reproducing magnetic field generated by the recording/reproducing electromagnet 35. In this embodiment, the recording magnetic field and the reproducing magnetic field are both generated by the same electromagnet 35. A control circuit 40 controls power supplied to the electromagnet 35 in recording and reproducing operation, respectively. The reproducing magnetic field intensity is preferably higher than the recording magnetic field intensity but lower than the initializing magnetic field intensity. An appropriate strength is selected according to the magnetic characteristics of the recording medium, for instance, within a range from 1000 to 5000 Oe for the initializing magnetic field, from 100 to 400 Oe for the recording magnetic field, and 1000 Oe or less for the reproducing magnetic field.

Further, in FIG. 3, a permanent magnet is usable as the initializing electromagnet 34. In the case where the recording magnetic field intensity is equal to the reproducing magnetic field intensity, it is possible to use a permanent magnet as the recording/reproducing magnet 35 together.

Figure 4:
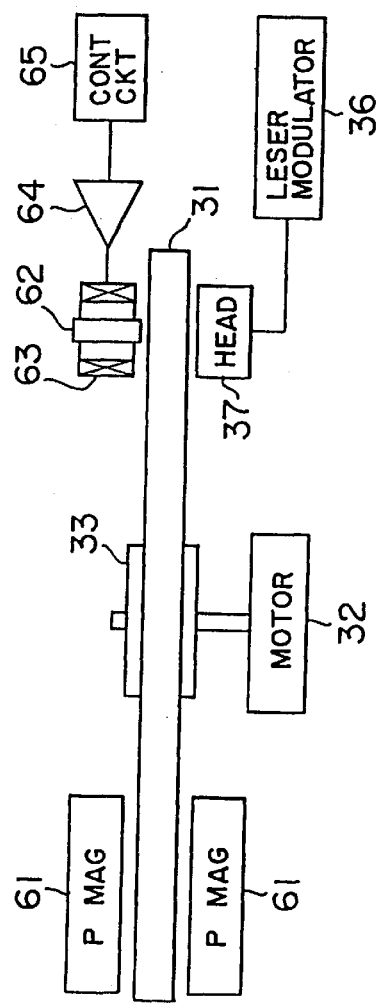
FIG. 4 is a diagrammatical view of assistance in explaining another embodiment.

FIG. 4 shows another embodiment of the present invention, in which the initializing magnet 61 is a permanent magnet. To generate the recording and reproducing magnetic fields, a combination magnet composed of a cylindrical permanent magnet 62 and an annular electromagnet 63 disposed coaxially with the permanent magnet 62 is disposed. The electromagnet 63 is driven by a driver 64 controlled by a control circuit, 65. The control circuit 65 controls the driver 64 in such a way that no current flows through the electromagnet 63 in recording operation but current flows through the electromagnet 63 to generate a magnetic field in the same direction as that of the permanent magnet 62 in reproducing operation. There fore, the magnetic field generated by the permanent magnet 62 is used as the recording magnet field, and the magnet field obtained by superposing the magnetic field of the permanent magnet 62 upon that of the electromagnet 63 is used as the reproducing magnet field.

Instead, the control circuit 65 controls the driver 64 in such a way that current flows through the electromagnet 63 to generate a magnetic field in the direction opposite to that of the permanent magnet 62 in recording operation but no current flows through the electromagnetic 63 in reproducing operation. Accordingly, relatively low magnetic field intensity obtained by superposing the magnetic field of the permanent magnet 62 upon that of the electromagnet 63 is used as the recording magnetic field, and the magnetic field generated by the permanent magnet 62 is used as the reproducing magnetic field.

Figure 5:
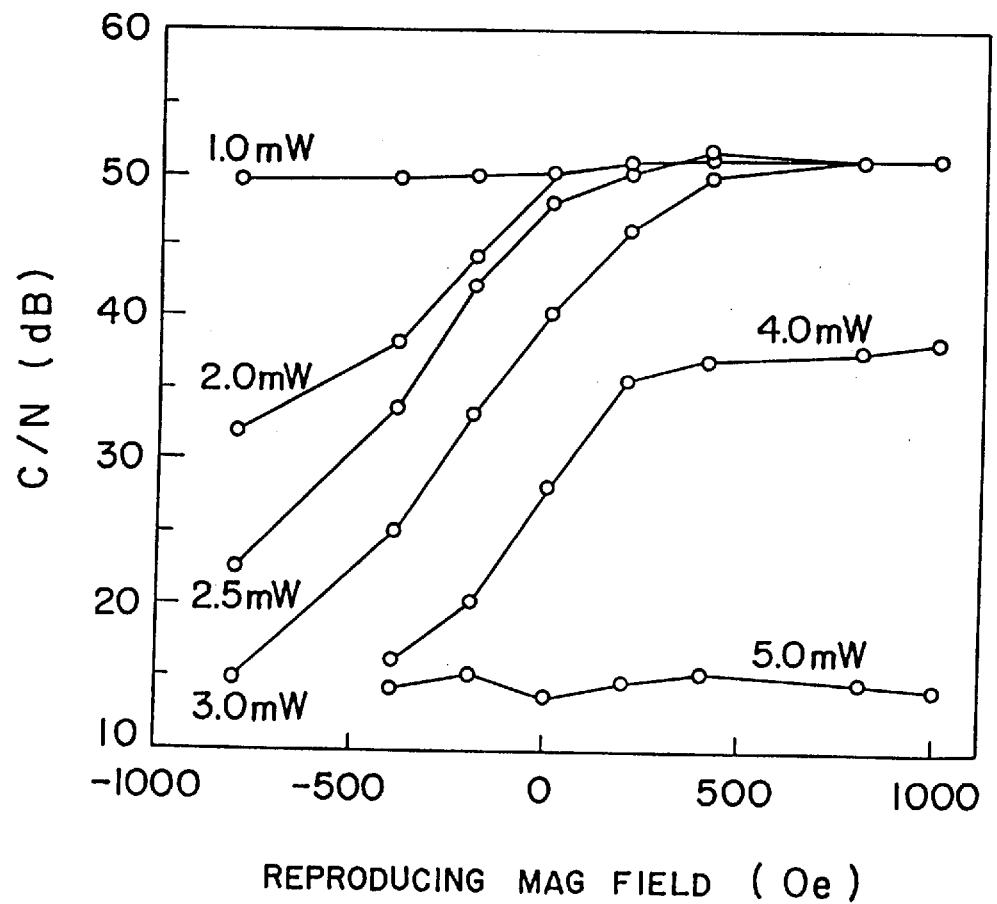
FIG. 5 is a graphical representation showing the dependency of the carrier-to-noise ratio (C/N) of reproduced signals opt the reproducing magnetic field intensity, obtained when data are reproduced at different laser beam intensity.

The test results of recorded data stability when reproduced from the magneto-optical recording medium by use of the magneto-optical recording/reproducing apparatus shown in FIG. 3 will be described hereinbelow. The recording medium as shown in FIG. 2 is rotated at a linear velocity of about 5.6 m/sec and passed through the initializing magnetic field of 4000 Oe. A recording magnetic field of 200 Oe in strength, is applied to the recording medium in the direction the same as the initializing magnetic field at a position not subjected to the influence of the initializing magnetic field, and a modulated laser beam with a bottom power of 3.0 mW, a peak power of 12.0 mW, a carrier frequency of 3.7 MHz, and a duty ratio of 30% is focused onto the recording medium for recording data, in which the L recording (first heating) is achieved at the laser beam bottom and the H recording (second heating) is achieved at the laser beam peak. Data are reproduced by irradiating a reproducing laser beam of a constant strength upon the memory layer within the reproducing magnetic field of a predetermined strength. The reproducing area passes through the initializing magnetic field immediately before the reproducing operation starts. FIG. 5 shows the dependency of the ratio of carrier to noise (C/N) of the reproduced signal upon the reproducing magnetic field intensity, in which the recorded data are reproduced by various laser beams of different intensities, and the positive sign of the reproducing magnetic field indicates that the reproducing magnetic field is applied in the same direction as the recording magnetic field and the negative sign thereof indicates that the reproducing magnetic field is applied in the direction opposite to the recording magnetic field.

FIG. 5 indicates that when data are reproduced by a relatively low reproducing power of about 1 mW, the C/N ratio is almost constant irrespective of the sign and intensity of the reproducing magnetic field; however, the C/N ratio decreases with increasing reproducing power in lower reproducing magnetic field intensity. Further, the C/N ratio is 38.0 dB when data are reproduced at a reproducing magnetic field of zero and at a reproducing power of 3.0 mW. However, it was found that the C/N ratio dropped down to 37.5 dB when data were reproduced at a reproducing power of 1.0 mW after having been reproduced at 3.0 mW. These C/N ratios are smaller than that of 50 dB obtained when data are reproduced at 1.0 mW immediately after recording. This may be due to the fact that magnetic domain patterns representative of data written in the memory layer change so that irreversible data destruction occurs.

On the other hand, in a range (>200 Oe) where the reproducing magnetic field intensity is higher than the recording magnetic field (200 Oe), the C/N ratio equivalent to that obtained at 1.0 mW can be obtained as far as the reproducing power is not extremely high, and a drop of the C/N ratio is not observed even if data are reproduced at 3.0 mW which is equal to the bottom power at recording.

Figure 6:
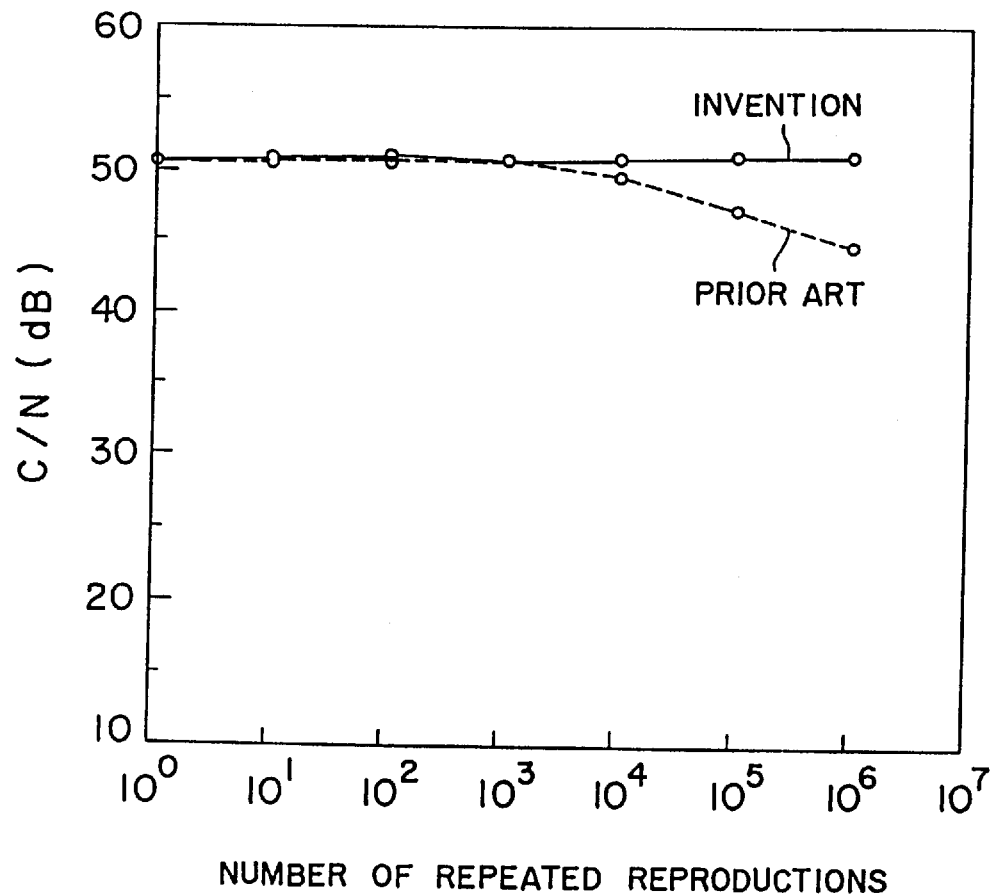
FIG. 6 is a graphical representation showing the relationship between the C/N ratio and the number of repeated reproductions, in which the solid line indicates the relationship obtained by the magneto-optical recording/reproducing method according to the present invention and the dashed line indicates that obtained by the prior-art magneto-optical recording/reproducing method.

FIG. 6 shows the test results obtained when data are repeatedly in accordance with the magneto-optical recording/reproducing method according to the present invention in comparison with the prior-art method. The solid line shows the relationship between the C/N ratio and the number of repeated reproductions obtained when recorded data are reproduced at a reproducing magnetic field intensity of 400 Oe and a reproducing laser power of 1.5 mW in accordance with the present invention, which indicates that no drop in the C/N ratio (indicative of reproduced signal degradation) is observed after data have been repeatedly reproduced in the order of $10^6$ times. The dashed lines shows the similar relationship obtained when recorded data are reproduced at a reproducing magnetic field intensity of 0 Oe and a reproducing laser power of 1.5 mW in accordance with the prior-art method, which indicates that the C/N ratio starts to be degraded at about $10^4$ times and therefore the recorded data are regarded as being destructed. In other words, the present invention can prevent the recorded data from being destructed or the reproduced signals from being degraded even after data have been repeatedly reproduced, thus resulting in a higher reproduced data reliability.

The similar test results as described above can be observed in the magneto-optical recording mediums made of various different materials or formed of exchange coupled multilayer magnetic films of different types.

The present invention is not limited to only the above-mentioned embodiments, and therefore modified into various ways. For instance, the apparatus shown in FIG. 3 or 4 can be utilized for only reproducing data. In this case, the initializing magnet 34 or 61 can be eliminated as far as the recording medium has already been passed through an initializing magnetic field before reproduction.

As described above, the present invention provides a magnito-optical method and apparatus for recording/reproducing data, which is usable in a wide allowable range of the ambient temperature and the reproducing laser power in data reproducing operation. In addition, the present invention provides a magneto-optical apparatus for recording/reproducing data, by which the recorded data are not destructed or the reproduced signals are not degraded after repeated data reproductions, and a high reliability can be realized even when data are reproduced from a high sensitive recording medium.

What is claimed is:

1. A method of recording and reproducing data recorded in a magneto-optical recording medium formed by laminating a first magnetic layer having a relatively high coercive force at room temperature and a relatively low Curie point and a second magnetic layer having a relatively low coercive force at room temperature and a relatively high Curie point so that these magnetic layers are exchange coupled to each other, the data being recorded as magnetization directions of the first magnetic layer on the recording medium, the method comprising the steps of:

(a) irradiating a laser beam upon the recording medium and applying a recording magnetic field thereto so as to record the data;

(b) applying a reproducing magnetic field of the same direction as the recording magnetic field to an area on the recording medium at which the data are recorded; and (c) irradiating a laser beam upon the data recorded area simultaneously when the reproducing magnetic field is applied under a condition that directions of magnetization of the second magnetic layer are aligned in a direction so as to reproduce the recorded data.

2. An apparatus for recording and reproducing data recorded in a magneto-optical recording medium formed by laminating a first magnetic layer having a relatively high coercive force and a relatively low Curie point at room temperature and a second magnetic layer having a relatively low coercive force and a relatively high Curie point at room temperature so that these magnetic layers are exchange coupled to each other, the data being recorded as magnetization directions of the first magnetic layer of the recording medium, the apparatus comprising:

(a) means for recording data by irradiating a laser beam upon the recording medium and applying a recording magnetic field thereto;

(b) means for irradiating a reproducing laser beam upon the recording medium when data are reproduced;

(c) means for aligning directions of magnetization of the second magnetic layer in a direction; and (d) means for applying a reproducing magnetic field of the same direction as the recording magnetic field to an area irradiated with the reproducing laser beam to reproduce the recorded data from the recording medium.

* * * * *